March 21, 1967  S. LARKIN  3,310,075
AUTOMATIC MACHINES FOR FORMING AN INTERMEDIATE ZIG-ZAG
WIRE AND WELDING IT TO OUTER PARALLEL WIRES
Filed Nov. 23, 1964  2 Sheets-Sheet 1
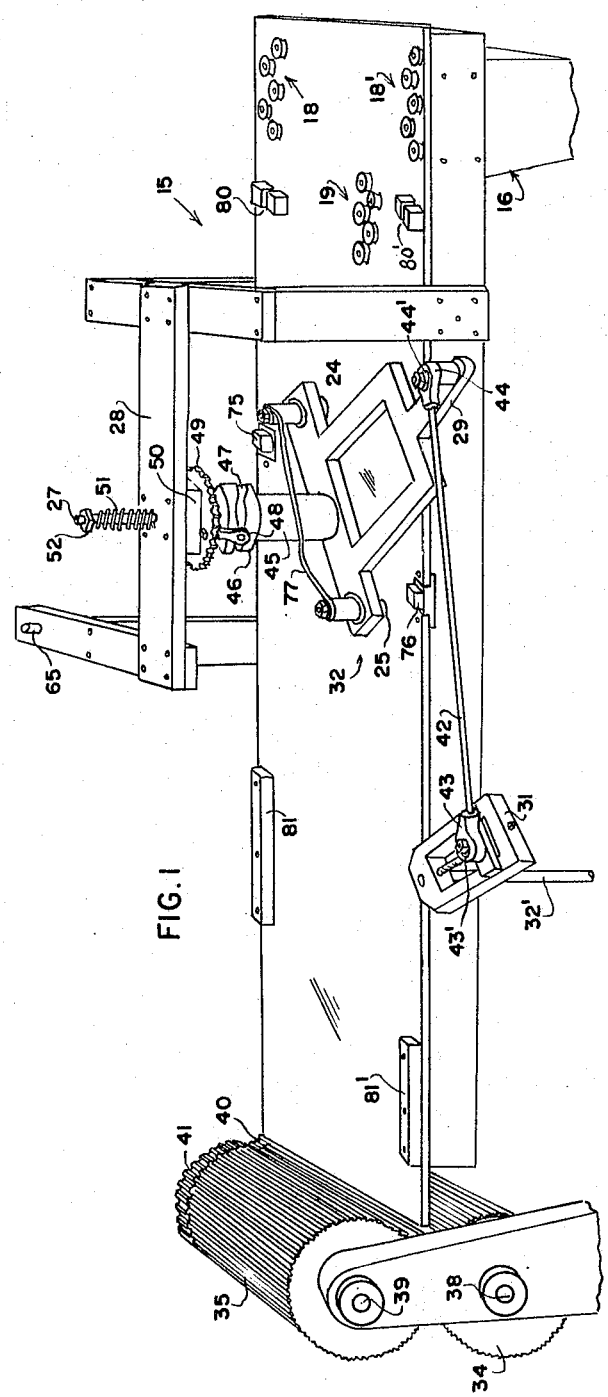
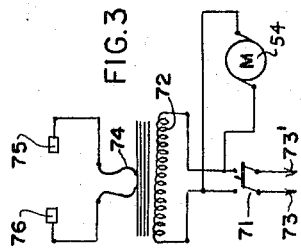
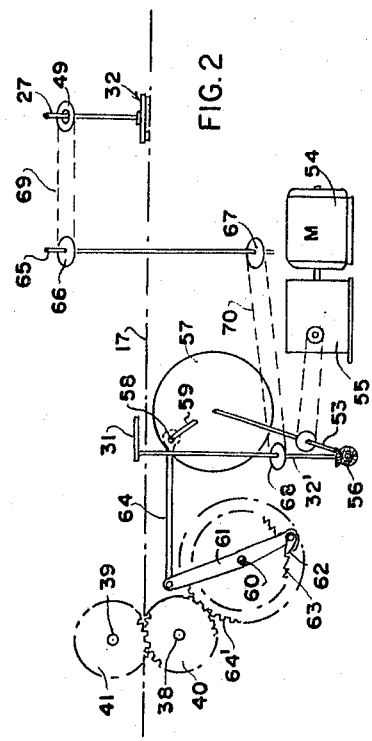
INVENTOR,
Sam Larkin,
BY
ATTORNEY.

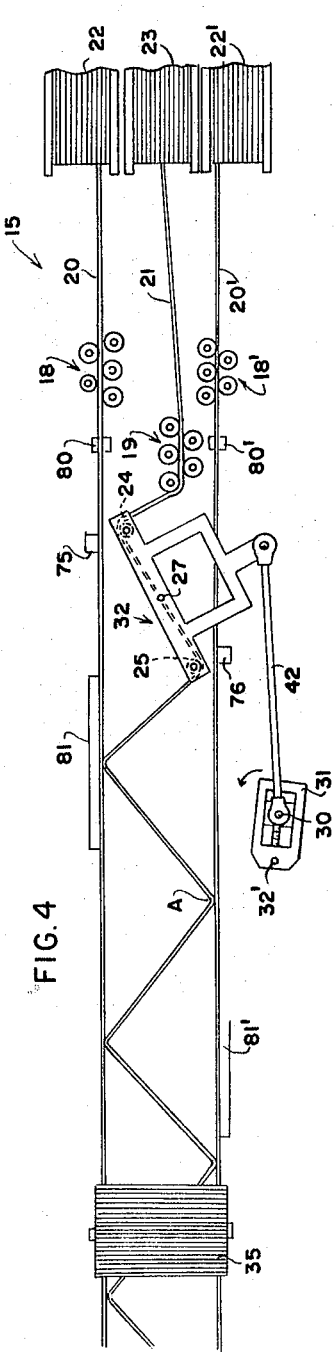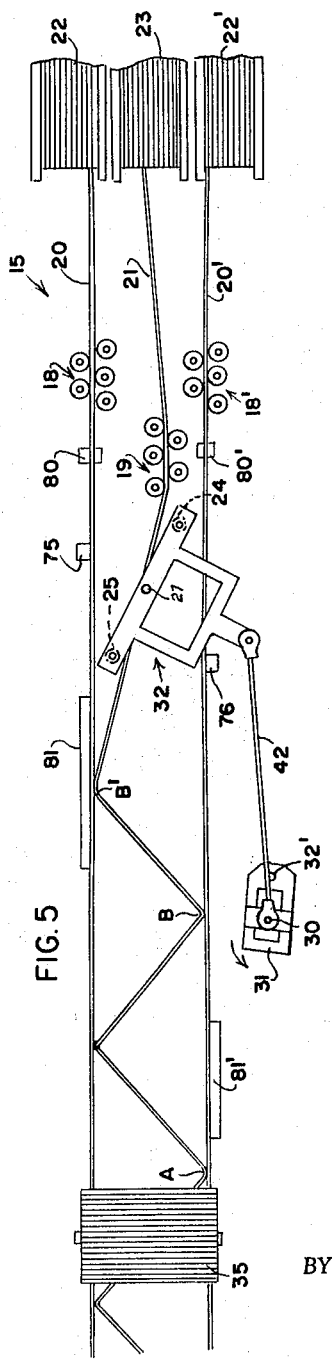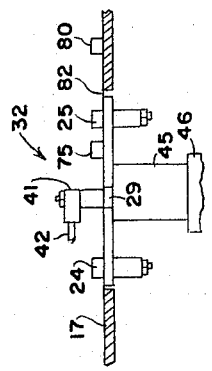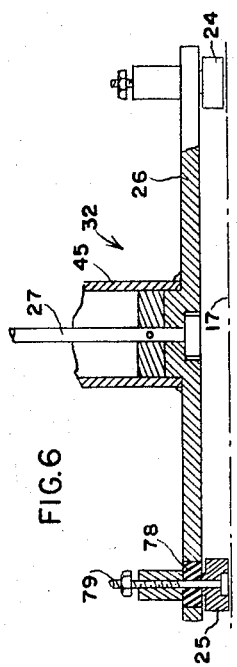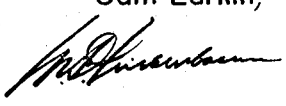
INVENTOR,
Sam Larkin,
BY
ATTORNEY.

United States Patent Office 3,310,075
Patented Mar. 21, 1967

3,310,075
AUTOMATIC MACHINES FOR FORMING AN INTERMEDIATE ZIG-ZAG WIRE AND WELDING IT TO OUTER PARALLEL WIRES
Sam Larkin, 254 Beach 140th St.,
Belle Harbor, N.Y. 10030
Filed Nov. 23, 1964, Ser. No. 413,096
11 Claims. (Cl. 140—112)

The present invention relates to automatic wire-working machinery of the class in which a plurality of wires are supplied off reels to pass through the machines where some bending takes place and then all wires are joined by welding to form a predetermined unitary structure whereupon worked-on portions leave the machine and ensuing portions are in position for repetition of the cycle of operation.

The principal object of this invention is to provide a novel and improved automatic machine for making a structure comprising three coplanar wires, two of which are in spaced parallel relation, with the third wire between them being bent in zig-zag form and its bends welded to the other two. This product, in various lengths, is used as reinforcement in wall and concrete constructions.

Another object thereof is to provide a novel and improved automatic machine for making the mentioned product, which is simple in construction, reasonable in cost to manufacture, easy to understand and maintain, and which is efficient in carrying out the purpose for which it is designed.

Other objects and advantages will become apparent as this disclosure proceeds.

For one practice of this invention, the machine comprises a wire receiving station where the three wires supplied off reels, pass through straightening means, a bending and welding station where the middle wire is bent into zig-zag form and welded to the other two at the bends and finally there is a work pulling station where the finished work is engaged by corrugating nipping rollers. The bending of the middle wire is done by two rollers on the underside of an upwardly suspended horizontal bar which is pivotally mounted at its center on a vertical axis midway between the outer parallel wires. This bar is constantly oscillated. When it moves in one direction, the nipping rollers being at rest, the middle wire is bent and brought into resilient pressing contact with the outer wires which are against fixed welding electrodes outside them; said electrodes being connected respectively to the secondary terminals of an induction heating transformer. Said rollers are electrically connected, hence the welding circuit is closed when the bends made in the middle wire contact the outer wires. Said bending rollers are at the opposite ends of said oscillating bar, equi-spaced from said axis of swing. When said bar is ready to move in the other direction, a cam means raises it above the work, the nipping rollers are operated and so the work is advanced. When said bar is ready to move in the first direction, said cam means lowers it to be in operative bending position. The dwell offered said bar at its remote positions, gives sufficient time to accomplish the welds.

In the accompanying drawings forming part of this specification, similar characters of reference indicate corresponding parts in all the views.

FIG. 1 is a fragmentary perspective view showing a machine embodying the teachings of this invention.

FIG. 2 is a diagrammatic view showing the drives for operating the crank which oscillates the member carrying the bending rollers, the cam which raises and lowers said member and the mechanism for imparting intermittent rotation of the nipping rollers to feed the work.

FIG. 3 is a diagram showing the circuit of the welding apparatus.

FIG. 4 is a diagrammatic top plan view showing the machine condition where the middle wire is being bent in preparation for the welding operation.

FIG. 5 is like FIG. 4, but here the machine condition shown is where the member carrying the bending rollers is raised and the work has been advanced by the nipping rollers.

FIG. 6 is an enlarged, fragmentary view of the member carrying the bending rollers, shown partly in section.

FIG. 7 is a fragmentary elevational view showing a machine of modified construction wherein the member carrying the bending rollers is lowered below the table surface to allow the work to be pulled by the nipping rollers and then raised for the bending and welding operations.

In the drawing, the machine 15 has a frame indicated generally by the numeral 16, which includes an elongated table 17, at one end of which are the wire straightening means 18, 18′, 19 for the outer wires 20, 20′ and the middle wire 21 respectively, which come off the supply reels, 22, 22′ and 23 respectively. The outer wires go through the machine in a prescribed spaced-apart parallel relation while the middle wire is between the vertical rollers 24, 25 which are near the respective ends and on the undersurface of a horizontally positioned member which may be a bar 26. This bar, midway between said rollers, is swivelled on the lower end of a vertical rod 27 which is slidably mounted through a frame element 28 positioned above the table 17. Said bar 26 has laterally extending structure 29, in its general plane. Said bar oscillates constantly while the machine is in operation, so for such purpose, there is an adjustable crank pin 30 on a crank 31 which is on a vertical shaft 32′ positioned in front of the table 17, between the oscillatable device 32 and the horizontal nipping and corrugating rollers 34, 35 which pull the work through the machine. Said shaft 32′ is supported in a bearing (not shown), and suitable framework supports said nipping rollers. The shafts 38, 39 carrying said rollers 34, 35, also carry the meshed gears 40, 41 respectively. A connecting rod 42, having standard universal joint ends 43, 44, links the crank pin 30 and the oscillatable device 32. Said rod ends include ball joints 43′, 44′ which allow the rod 42 to tilt, which is required because the device 32, has to be raised and lowered during the operation of the machine. For this purpose, the bar 26, has welded on its upper side, the tubular member 45 which carries a drum cam 46, in whose track 47, a follower 48 depending from a sprocket 49, is engaged; said sprocket being journalled in a frame block bearing 50, through which the rod 27 passes in concentric relation with said sprocket. A compression coil spring 51 about the upper end of the rod 27, bears against the upper side of the frame element 28 and the adjustable nut 52 at the upper end of said rod, to assure movement of the oscillating device 32 along the vertical, as determined by said cam 46.

The main shaft 53 of the machine is horizontally positioned, journalled in suitable framework not shown and is driven by a motor 54 through a suitable gear reduction means 55. Said main shaft extends across the machine below the table 17 on which the wires 20, 21, 20′ slide, and by means of the mitre gears 56, drives the shaft 32′. The rear end of said main shaft carries a crank 57 whose pin 58 is adjustable along the slot 59. A journalled shaft 60, carries a loose arm 61 having a spring-biased pawl 62 in engagement with a ratchet wheel 63 which is secured to a gear 64′ on said shaft 60. A connecting rod 64 links the crank pin 58 with arm 61 while the gear 64′ meshes with the gear 40. Said ratchet and pawl are arranged so that the nipping rollers 34, 35 turn in proper direction to pull the work through the machine. A vertical shaft 65 journalled on the frame, carries the sprocket wheels 66, 67. The shaft 32' carries a sprocket wheel 68. The sprockets 66 and 49 are connected by a chain 69. The sprockets 67 and 68 are connected by a chain 70.

A circuit controlled by the switch 71, powers the motor 54 and an induction welding transformer; said motor and the primary winding 72 of the transformer, being connected across the power supply lines 73, 73' when said switch is closed. The secondary winding 74 of said transformer, has one terminal thereof connected to a conductive block 75 and the other terminal thereof is connected to a conductive block 76; these blocks being electrodes on the table 17, but insulated therefrom. The wire 20, in its passage through the machine, bears against the block 75, while the wire 20', in its passage through the machine, bears against the block 76; each such contact being with an upright wall of a block. These blocks are positioned so that at the end of the movement of the bar 26 in one direction after its rollers 24 and 25 have each caused a separate bend in the middle wire 21, said bends will contact the respective outer wires 20, 20' and each of said bending rollers will press the bend it just made and the outer wire next to it, against one of said blocks whereupon welding will take place, that is, the bends in the middle wire will be welded to the outer wires respectively; the secondary circuit being closed. The path of the welding current will be from one terminal of the secondary winding 74, through one joint to be welded, then through the conductor 77 connecting the stud shafts of the bending rollers 24, 25, then through the other joint to be welded and thence to the other secondary terminal. To make a proper weld, pressure is afforded by having each of the bending rollers resiliently mounted by use of a rubber bearing as 78 for the roller stud 79 as shown in FIG. 6, and such pressure is maintained a sufficient interval of time afforded by the dwell occurring immediately before reversal of direction of the device 32.

After loading the machine with the wire supply reels 22, 23, 22', the wires are threaded through their respective straightening means 18, 19, 18', the outer wires 20, 20' are set in the spacing guides 80, 80' respectively and inwardly against the guides 81, 81' respectively, while the middle wire 21 is set between the bending rollers 24 and 25. Then the lead ends of said wires are passed through the nipping rollers 34, 35 whose drive mechanism is adjusted so that the intermittent length of feed effected is equal to the distance between bends along an outside wire, that is, the distance AB. The machine is then set in operation by closing the switch 71. The device 32 will make one complete oscillation per revolution of the crank 31. It is to be noted that the shaft 32' and the sprocket 49 make the same number of revolutions per unit of time.

Referring now to FIG. 4, the device 32 is rotating counter-clockwise and its rollers 24, 25 are making bends in the middle wire 21; said device being at its lowered position. At the end of said counter-clockwise movement, the bends made are resiliently pressed against by the rollers which formed them, the welding circuit is closed and the welds B and B' are made. The cam 46 now raises the device 32 to clear the work, whereupon the nipping rollers 34, 35 are operated to pull the work a distance AB and the device 32 moves clockwise, but while so moving, the cam causes it to be lowered so the middle wire 21 is between the bending rollers 24 and 25 as shown in FIG. 5. The cycle is now ready to be repeated ad infinitum, that is, while the wire supply lasts. It is therefore evident that during the first half of the cycle of operation, that is while bending and welding is being done, the pawl 62 rides on the teeth of the ratchet wheel 63, for the rod 64 is moving towards the left in FIG. 2, so the nipping rollers 34, 35 are at rest, and during the last half of the cycle, the pawl engages said teeth and the nipping rollers are moved to pull the work, while the device 32 is up.

As shown in FIG. 7, the machine may be built so that the oscillating device 32 and the structure it carries and which supports same, may be inverted with respect to the arrangement shown in FIG. 1, so that during bending and welding, only the rollers 24, 25 are above the upper surface of the table 17, and then through a suitable opening 82 in said table, said device 32 is lowered for the work-advancing operation by the nipping rollers 34, 35, when said bending rollers would be below table surface. The frame structure including the member 28 and the components 45–52 would be positioned below the table 17.

The bending rollers 24, 25 and the blocks 75, 76 serve as electrodes in the welding apparatus, and hence are of high electrical conductivity, as for instance copper of the metal alloy marketed under the mark "Elkonite." All wire stock used shall be metal of comparatively low electrical conductivity as iron. The middle wire 21 which is to be bent into zig-zag form, shall be of the nature that when bent, it shall stay bent.

This invention is capable of numerous forms and various applications without departing from the essential features herein disclosed. It is therefore intended and desired that the embodiments explained herein shall be deemed merely illustrative and not restrictive and that the patent shall cover all patentable novelty herein set forth; reference being had to the following claims rather than to the specific showing herein to indicate the scope of this invention.

I claim:

1. In a machine for bending a middle wire into zig-zag formation between two spaced straight parallel wires, both coplanar with the middle wire and in contact with alternate bends made in said middle wire respectively and then welding the contacting regions of said wires to effect a unitary structure, a frame, means on the frame for supporting two wires coming to one end of the machine from off sources of supply so that said wires shall lie along straight parallel lines spaced apart a predetermined distance, means on the frame for supporting a bendable wire coming to said one end of the machine between said two wires, from a source of supply, a first mechanism on the frame, adapted when actuated, to move said three wires towards the other end of the machine; said three wires when on the machine, lying on a common plane, a member intermediate the ends of the machine, positioned spaced from and parallel to said plane and having two spaced, electrically connected bending rollers thereon between said parallel lines; said bending rollers extending from one face of said member, in one position of said member, substantially to said plane, and adapted when in said one position to intercept said middle wire when the latter is on the machine, means to oscillate said member; the distance between said bending rollers, measured between remote points thereof, being greater than the distance between said parallel lines, means on the other face of said member, supporting said member midway between said bending rollers for oscillation between said parallel lines, a second mechanism adapted when actuated, to move said member along its axis of oscillation to a second position away from said plane so said bending rollers clear said middle wire when the latter is on the machine and back again to said first position, a means to actuate said mechanisms in a predetermined timed relation and an electrical induction welding apparatus comprising a transformer having primary and secondary windings and two electrodes fixed on the frame, insulated therefrom and from each other and connected respectively to the terminals of said secondary winding; said electrodes being positioned so that when said parallel wires are on the machine, they will be between said electrodes and each of said parallel wires will contact one of said electrodes respectively and each of said bending rollers being adjacent one of said electrodes when said oscilatable member is moved in one direction to the end of its travel in said direction whereat when said wires are on the machine, each of said rollers will press the middle wire and one of said parallel wires against one of said electrodes respectively; said electrodes and bending rollers having comparatively high electrical conductivity.

2. A machine as defined in claim 1, wherein the plane of said parallel lines is horizontal; said oscillatable member being above said plane; said bending rollers extending downwardly from said member.

3. A machine as defined in claim 1, wherein the plane of said parallel lines is horizontal; said oscillatable member being below said plane; said bending rollers extending upwardly from said member.

4. A machine as defined in claim 1, wherein the first mechanism comprises nipping rollers positioned at said other end of the machine, adapted when actuated, to pull said wires towards such other end of the machine.

5. A machine as defined in claim 1, wherein the means to oscillate said member comprises a crank and a connecting rod pivotally linked to said member at a point laterally spaced from the axis of oscillation of said member and to said crank, and means to rotate said crank.

6. A machine as defined in claim 1, wherein the second mechanism comprises a cam and a follower cooperating with said cam, and a rotatable member journalled on the frame; said cam being fixed to one of said members and said follower being fixed to the other of said members, and means to rotate said journalled member.

7. In a machine as defined in claim 6, wherein the axis of oscillation of said oscillatable member and the axis of rotation of said journalled member are the same; the cam being a drum cam.

8. In a machine as defined in claim 1, wherein the means to oscillate said member comprises a crank and a connecting rod pivotally linked to said member at a point laterally spaced from the axis of oscillation of said member and to said crank and wherein the second mechanism comprises a cam and a follower cooperating with said cam, and a rotatable member journalled on the frame; said cam being fixed to one of said members and said follower being fixed to the other of said members; said crank and journalled member having the same axial speed.

9. In a machine as defined in claim 8, wherein the axis of oscillation of said oscillatable member and the axis of rotation of said journalled member are the same; the cam being a drum cam.

10. In a machine as defined in claim 1, including resilient means on said member, holding said rollers a prescribed distance apart; said rollers being capable of some movement towards each other whereby said resilient means is stressed and thereby biases said rollers to move apart to assume said distance.

11. In a machine as defined in claim 10, wherein each of said rollers is on a stud carrying a rubber collar; said collars being held fast on said oscillatable member and said studs being spaced from the body of said member.

References Cited by the Examiner

UNITED STATES PATENTS

| | | | |
|---|---|---|---|
| 2,792,852 | 5/1957 | Talbot et al. | 140—112 |
| 2,868,952 | 1/1959 | Schulte et al. | 140—112 |
| 3,027,920 | 4/1962 | Payne et al. | 140—112 |
| 3,192,963 | 7/1965 | Barbou | 140—112 |
| 3,198,219 | 8/1965 | Grebner et al. | 140—112 |
| 3,219,066 | 11/1965 | Smith | 140—112 |

CHARLES W. LANHAM, *Primary Examiner.*

E. M. COMBS, *Assistant Examiner.*